United States Patent Office 3,227,681
Patented Jan. 4, 1966

3,227,681
ONIUM CATALYSTS FOR POLYCARBONATE PREPARATION
André Jan Conix, Hove-Antwerp, Belgium, assignor to Gevaert Photo-Producten N.V., Mortsel, Belgium, a Belgian company
No Drawing. Filed Mar. 13, 1961, Ser. No. 95,002
Claims priority, application Germany, Mar. 16, 1960, G 29,246; Apr. 21, 1960, G 29,498
1 Claim. (Cl. 260—47)

This invention relates to an improved process for the manufacture of high molecular weight linear thermoplastic polycarbonates. More particularly it relates to such a process wherein onium compounds are used as catalysts.

It is known to prepare highly polymeric polycarbonates by reacting diphenols with phosgene or with dichlorocarbonic acid esters of diphenols in an aqueous alkaline solution or suspension. It is also known to use as catalysts in these condensation methods small amounts of quaternary ammonium compounds in form of their free bases or their salts.

It has now been found that by reacting diphenols with phosgene or with dichlorocarbonic acid esters of diphenols in an aqueous alkaline solution or suspension, highly polymeric thermoplastic polycarbonates which are soluble in organic solvents and melt at higher temperatures without decomposition are obtained much more rapidly, by adding to the reaction mixture as polymerization catalysts minor amounts of quaternary arsonium compounds and/or quaternary phosphonium compounds and/or tertiary sulfonium compounds in form of their free bases or their salts.

In principle any quaternary arsonium compound and/or quaternary phosphonium compound and/or tertiary sulfonium compound may be used as a catalyst; preferably, however, such catalysts are used which are soluble in water or in the solvent which is employed for carrying out the polycondensation.

Suitable quaternary arsonium compounds are e.g.

Methyl triphenyl arsonium iodide,
Triphenyl benzyl arsonium bromide,
Triphenyl-p-nitrobenzyl arsonium bromide,
Triphenyl benzyl arsonium chloride,
Trimethyl octyl arsonium iodide,
Triethyl benzyl arsonium iodide,
Diphenyl benzyl-$\alpha$-naphthyl arsonium iodide,
Dicarboxymethyl triphenyl arsonium bromide, and many others such as e.g. those described by A. Michaelis, Ann. Chem. 321 (1902), pp. 141–248.

Suitable quaternary phosphonium compounds are e.g.

Triphenyl methyl phosphonium iodide,
Triphenyl benzyl phosphonium chloride,
p-Xylylene-bis(triphenylphosphonium chloride),
Tetraethyl phosphonium bromide,
Triethyl octadecyl phosphonium iodide,
Ethyl cyclopentamethylene phenyl phosphonium acetate,
p-Xylylene-bis(triethyl phosphonium bromide),
Bis-(triethyl phosphonium acetate)-1,4-butane, and many others such as those described by G. M. Kosolapoff, Organophosphorous Compounds (John Wiley and Sons, Inc., New York, 1950), pp. 86–94.

Suitable quaternary sulphonium compounds are e.g.:

2-hydroxyphenyl dimethyl sulphonium chloride,
3,5-dihydroxyphenyl dimethyl sulphonium chloride,
S,S'-p-xylylene-bis(dihydroxyethyl sulphonium bromide), and
Hexamethylene-S,S'-bis(dimethyl)-1,6-disulphonium bromide.

The advantages of using quaternary arsonium and phosphonium compounds appear from the following table, in which are given comparative intrinsic viscosity values of polycarbonates. The polycarbonate prepared by reacting the dichloroformate of 2,2,-bis(4'-hydroxyphenyl)-propane with 2,2-bis(4'-hydroxyphenyl)-propane is concerned here.

| | Catalyst | | | |
|---|---|---|---|---|
| | Triphenyl methyl arsonium iodide | | Triethyl benzyl ammonium chloride | |
| | Concentration | | Concentration | |
| | 0.05% | 2% | 0.05% | 2% |
| | Intrinsic viscosity values | | Intrinsic viscosity values | |
| Reaction period: | | | | |
| 5 min | | 0.96 | | 0.1 |
| 30 min | 0.68 | 1.65 | 0.26 | 0.70 |

| | Catalyst | | | | | |
|---|---|---|---|---|---|---|
| | Triphenyl benzyl phosphonium chloride | | Triphenyl methyl phosphonium iodide | | Triethyl benzyl ammonium chloride | |
| | Concentration | | Concentration | | Concentration | |
| | 0.05% | 2% | 0.05% | 2% | 0.05% | 2% |
| | Intrinsic viscosity values | | Intrinsic viscosity values | | Intrinsic viscosity values | |
| Reaction period: | | | | | | |
| 5 min | 0.41 | 0.90 | 0.40 | 0.9 | 0.1 | 0.1 |
| 30 min | 0.90 | 1.36 | 0.80 | 1.2 | | 0.7 |

Tertiary sulfonium compounds also accelerate the reaction, as appears from the following data.

| Reaction period of 5 min. | S,S'-p-xylene-bis-(dihydroxyethyl sulfonium bromide) in a 2% concentration | Triethylbenzyl ammonium chloride in a 2% concentration |
|---|---|---|
| Intrinsic viscosity | 0.38 | 0.1 |

The reaction period is measured from the moment that all the reagents are mixed. It appears from this table that:

(1) The arsonium compounds in comparison with the ammonium compounds much more accelerate the condensation. Already 5 min. after mixing the reagents the rather high intrinsic viscosity value of 0.96 is reached for the polycarbonate by using arsonium compounds, whereas on using ammonium compounds a polycarbonate is obtained having an intrinsic viscosity which is too low for practical purposes. Such a shortening of the polycondensation period confers the possibility for carrying out the preparation of polycarbonates according to a continuous operation;

(2) By means of arsonium and phosphonium compounds the finally obtained intrinsic viscosity values are markedly higher than when using ammonium compounds, e.g. 1.65 against 0.7 and 1.36 against 0.7 respectively;

(3) The catalyst as the case may be, can be applied in minute concentrations. This can influence the electric properties of the polymers obtained as residual traces of catalysts can be restricted to a minimum.

The diphenols which are considered for the preparation of the highly polymeric polycarbonates according to the present invention correspond to the following general formula:

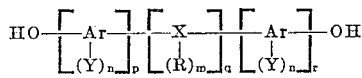

wherein:

Ar represents an aromatic nucleus such as a phenylene nucleus, a biphenylene nucleus or a naphthylene nucleus;

R represents a hydrogen atom, an alkyl group (such as a methyl group and an ethyl group), a halogenated alkyl group, an aryl group (such as a phenyl group and a naphthyl group), a halogenated aryl group, an aralkyl group (such as a benzyl group and a phenyl ethyl group), a halogenated aralkyl group, an alkyl substituted aryl group or a halogenated alkyl substituted aryl group; a cyclo-aliphatic group or a halogenated cyclo-aliphatic group;

X represents an alkylene or an alkylidene group such as methylene, ethylene, propylene, ethylidene, propylidene and isopropylidene, or two or more alkylene or alkylidene groups bonded together by an aromatic radical, by a tertiary amino radical (—N(alk)—); by an ether radical (—O—), by a carbonyl radical (—CO—), by a radical containing sulphur such as a sulphide (—S—), a sulphoxide (—SO—) or a sulphonyl (—SO$_2$—) radical. Moreover X can be cycloaliphatic group, or a radical containing sulphur, such as a sulphide, a sulphoxide or a sulphonyl group, an ether radical, a carbonyl radical or a tertiary amino radical;

Y represents a substituent which is inert in respect to the reaction medium and the reaction circumstances such as a halogen atom, a substituent such as a nitro group, a R' radical, or an OR' radical wherein R' has the same significance as set forth above for R;

m represents an integer of from 0 to the number of replaceable hydrogen atoms on X;

n represents an integer of from 0 to the number of replaceable hydrogen atoms of the aromatic nucleus Ar above;

p is an integer of at least 1;

q is an integer of from 0 to 1, and r is an integer which may be 0 if q is 0.

If in the diphenols according to the formula, more than one substituent Y is present, these substituents may be the same or different. This remark also applies to the substituent R. The hydroxyl groups and the substituents Y of the aromatic nuclei may occur in the ortho, meta- or para-positions.

Diphenols having the above general formula and which are suitable for being applied according to the present invention are e.g.

Bis(4-hydroxyphenyl)-methane
Bis(4-hydroxy-3-methylphenyl)-methane
Bis(4-hydroxy-3,5-dichlorophenyl)-methane
Bis(4-hydroxy-3,5-dibromophenyl)-methane
Bis(4-hydroxy-3,5-difluorophenyl)-methane
Bis(4-hydroxyphenyl)-ketone
Bis(4-hydroxyphenyl)-sulphide
Bis(4-hydroxyphenyl)-sulfone
4,4'-dihydroxydiphenyl ether
1,1-bis(4-hydroxyphenyl)-ethane
2,2-bis(4-hydroxyphenyl)-propane
2,2-bis(4-hydroxy-3-methylphenyl)-propane
2,2-bis(4-hydroxy-3-orthophenyl)-propane
2,2-bis(4-hydroxy-3,5-dichlorophenyl)-propane
2,2-bis(4-hydroxynaphthyl)-propane
Bis(4-hydroxyphenyl)-phenyl methane
Bis(4-hydroxyphenyl)diphenyl methane
Bis(4-hydroxyphenyl)-4'-methyl phenyl methane
1,1-bis(4-hydroxyphenyl)-2,2,2-trichloroethane
Bis(4-hydroxyphenyl)-(4''-chlorophenyl)-methane
1,1-bis(4-hydroxyphenyl)-cyclohexane
Bis(4-hydroxyphenyl)cyclohexyl methane
4,4'-dihydroxydiphenyl
2,2'-dihydroxydiphenyl
Dihydroxynaphthalenes such as 2,6-dihydroxynaphthalene
Hydroquinone
Resorcinol
2,6-dihydroxytoluene
2,6-dihydroxychlorobenzene
3,6-dihydroxytoluene Quaternary phosphonium and/or tertiary sulphonium and/or quaternary arsonium compounds can also be applied for the preparation of copolycarbonates by reacting one or more of the above diphenols with phosgene and/or bischlorocarbonic acid esters of diphenols occasionally mixed with aliphatic and/or cycloaliphatic and/or aromatic dicarboxylic acid chlorides and/or bischlorocarbonic acid esters or aliphatic and/or cycloaliphatic glycols.

Generally the diphenols are soluble in aqueous alkaline solutions. When they are only sparingly soluble in the aqueous alkaline solution, the reaction can be carried out in a suspension of the diphenol in the aqueous alkaline medium. As the reaction proceeds the undissolved diphenol dissolves before reacting.

The polycarbonates prepared according to the present invention are soluble in a series of organic solvents such as methylene chloride and chloroform. Some of them are soluble in benzene and toluene; from solutions they can also be worked up to shaped articles such as films and fibres which can be oriented by stretching for increasing markedly the mechanical strength of these products.

The polycarbonates are fusible without decomposition and for this reason can thus be worked up to shaped articles or coatings by moulding, injection moulding or other methods.

The following examples illustrate the present invention without limiting, however, the scope thereof. The values of intrinsic viscosity [$\eta$] were measured in sym.-tetrachloroethane at 25° C.

*Example 1*

In a 250 cm.³ three-necked flask fitted with a stirrer and a dropping funnel are placed 4.56 g. (0.02 mol) of 2,2-bis(4-hydroxyphenyl)-propane, 200 mg. (2% based on the weight of polymer) of triphenyl methyl phosphonium iodide, 40.8 g. of N sodium hydroxide (this being an excess of 2%) and 5 cm.³ of methylene chloride. Over 5 min. is added thereto a solution of 7.13 g. of dichloroformate of 2,2-bis(4-hydroxyphenyl)-propane (0.02 mol and an excess of 1%) in 15 cm.³ of methylene chloride. After rinsing the dropping funnel with 5 cm.³ of methylene chloride, the mixture is stirred for a further 30 min. The concentration of the polymer amounts to 40% based on the methylene chloride.

During the polycondensation the reaction mixture separates into a highly viscous organic layer and a water layer which is decanted. After washing the organic layer with water, the polymer is precipitated by pouring in boiling water. The formed flakes are dried at 110° C. Yield: 10 g. [$\eta$]=1.24 dl./g.

The formed polycarbonate corresponds to the formula

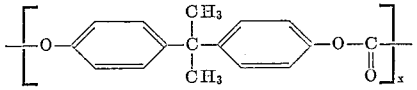

*Example 2*

The same procedure as in Example 1 is carried through with the difference, however, that the reaction mixture is stirred for only 5 min. [$\eta$]=0.9 dl./g.

*Example 3*

The same procedure as in Example 1 is carried through, employing, however, as a catalyst but 5 mg. of triphenyl methyl phosphonium iodide (0.05% based on the weight of polymer) instead of 200 mg. As in Example 1 stirring is continued for 30 minutes. [η]=0.8 dl./g.

*Example 4*

The same procedure as in Example 1 is carried through, employing, however, but 5 mg. of triphenyl methyl phosphonium iodide (0.05% based on the weight of polymer) instead of 200 mg. and stirring for only 5 min. [η]=0.4 dl./g.

*Example 5*

The same procedure as in Example 1 is carried through, employing, however, as a catalyst 200 mg. of triphenyl methyl arsonium iodide instead of 200 mg. of triphenyl methyl phosphonium iodide. [η]=1.65 dl./g.

*Example 6*

The same procedure as in Example 1 is carried through using, however, as a catalyst 200 mg. of triphenyl methyl arsonium iodide and stirring the reaction mixture for only 5 min. [η]=0.96 dl./g.

*Example 7*

The same procedure as in Example 1 is carried through, using, however, as a catalyst 5 mg. of triphenyl methyl arsonium iodide (0.05% based on the weight of polymer). [η]=0.68 dl./g.

*Example 8*

In a 3 l. three-necked fitted with a stirrer, a dropping funnel and a thermometer are placed 70 g. of sodium hydroxide 145 g. of 2,2-bis(4'-hydroxyphenyl)-propane, 700 cm.³ of water and 400 cm.³ of methylene chloride. Over 90 min. 73 g. of phosgene are introduced, whereby care should be taken by suitably cooling that the temperature remains below 25° C. 5 min. after the introduction of phosgene, 3 g. of triphenyl phosphonium chloride are added to the reaction mixture which is then still stirred for 45 min. The obtained stiff paste is diluted with methylene chloride and the polymer is precipitated with boiling water. [η]=1.18 dl./g.

*Example 9*

The same procedure as in Example 8 is carried through, employing as a catalyst, however, 3 g. of triphenyl methyl arsonium iodide. [η]=1.32 dl./g.

*Example 10*

In a 250 cm.³ three-necked flask fitted with a stirrer and a dropping funnel are placed 4.56 g. (0.02 mol) of 2,2-bis(4'-hydroxyphenyl)-propane, 200 mg. of triphenyl benzyl phosphonium chloride (2% based on the weight of polymer, 40.8 cm.³ of N sodium hydroxide (this being an excess of 2%) and 5 cm.³ of methylene chloride. Over 5 min. is added a solution of 7.13 g. of dichloroformate of 2,2-bis(4'-hydroxyphenyl)-propane (0.02 mol, this being an excess of 1%) in 15 cm.³ of methylene chloride. After rinsing the dropping funnel with 5 cm.³ of methylene chloride, the mixture is stirred for another 30 min. During the polycondensation the reaction mixture separates into a highly viscous organic layer and a water layer which is decanted. After washing the organic layer with water, the polymer is precipitated by pouring in boiling water. The formed flakes are dried at 110° C. [η]=1.36 dl./g.

*Example 11*

The same procedure as in Example 10 is carried through, employing, however, as a catalyst 200 mg. of triphenyl benzyl arsonium iodide instead of the same quantity of triphenyl benzyl phosphonium chloride. [η]=1.30 dl./g.

*Example 12*

The same procedure as in Example 10 is carried through, employing however as a catalyst only 5 mg. of triphenyl benzyl phosphonium chloride (0.05% based on the weight of polymer). [η]=0.65 dl./g.

*Example 13*

The same procedure as in Example 10 is carried through, stirring, however, for only 5 min. [η]=0.9 dl./g.

*Example 14*

The same procedure as in Example 10 is carried through, employing, however, as a catalyst 200 mg. of p-xylylene-bis(triphenyl phosphonium chloride). [η]=1.19 dl./g.

*Example 15*

The same procedure as in Example 10 is carried through, employing, however, as a catalyst 200 mg. of triphenyl hydroxyethyl phosphonium chloride. [η]=1.1 dl./g.

*Example 16*

In a 250 cm.³ three-necked flash fitted with a stirrer and a dropping funnel are placed 3.66 g. (0.01 mol) of 2,2-bis(4'-hydroxy-3',5'-dichlorodiphenyl)-propane, 120 mg. of triphenyl benzyl phosphonium chloride, 20.4 cm.³ of N sodium hydroxide and 3 cm.³ of methylene chloride. Over 5 min. is added thereto a solution of 3.565 g. of dichloroformate of 2,2-bis(4'-hydroxyphenyl)-propane (0.01 mol and an excess of 1%) in 7 cm.³ of methylene chloride. After rinsing the dripping funnel with 5 cm.³ of methylene chloride, the mixture is stirred for another 30 min. During the polycondensation the reaction mixture separates into a highly viscous organic layer and a water layer which is decanted. After washing the organic layer with water, the polymer is precipitated by pouring in boiling water. The formed flakes are dried at 110° C. Yield: 6.5 g. [η]=1.28 dl./g.

The formed polycarbonate corresponds to the formula

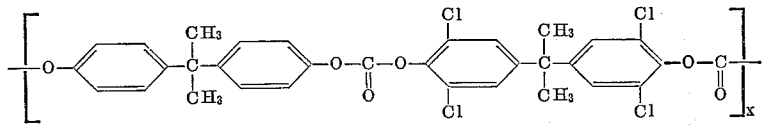

*Example 17*

The same procedure as in Example 16 is carried through, employing however as a catalyst 120 mg. of triphenyl methyl arsonium iodide. [η]=1.41 dl./g.

*Example 18*

In a 250 cm.³ three-necked flask fitted with a stirrer and a dropping funnel are brought 2.28 g. of bis(4-hydroxy-3-methylphenyl)-methane (0.01 mol), 120 mg. of triphenyl benzyl phosphonium chloride, 20.4 cm.³ of N sodium hydroxide and 3 cm.³ of methylene chloride. Over 5 min. is added thereto a solution of 3.565 g. (0.01 mol plus an excess of 1%) of dichloroformate of 2,2-bis(4'-hydroxyphenyl)-propane in 7 cm.³ of methylene chloride. After rinsing the dropping funnel with 5 cm.³ of methylene chloride, the mixture is stirred for another 30 minutes. During the condensation the reaction mixture separates into a highly viscous organic layer and a water layer which is decanted. After washing the organic layer with water, the polymer is precipitated by pouring in boiling water. The formed flakes are dried at 110° C. Yield: 5 g. [η]=1.35 dl./g.

The formed polycarbonate corresponds to the formula

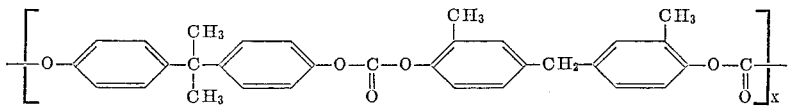

Example 19

The same procedure as in Example 18 is carried through, employing however as a catalyst 120 mg. of triphenyl methyl arsonium iodide. [η]=1.16 dl./g.

Example 20

In a 250 cm.³ three-necked flask fitted with a stirrer and a dropping funnel are brought 3.175 g. (0.01 mol) of 1,1-bis(4'-hydroxyphenyl)-2,2,2-trichloroethane and 120 mg. of triphenyl benzyl phosphonium chloride. Slowly and successively are added thereto whilst cooling in a bath of ice and acetone at −5° C., 20.4 cm.³ of N sodium hydroxide (an excess of 2%) and 3 cm.³ of methylene chloride. Over 5 min. is added to this mixture at −5° C. a solution of 3.565 g. (0.01 mol plus an excess of 1%) of dichloroformate of 2,2-bis(4'-hydroxyphenyl)-propane in 7 cm.³ of methylene chloride. After rinsing the dropping funnel with 5 cm.³ of methylene chloride, cooling is stopped and stirring is continued for 30 min. During the polycondensation the reaction mixture separates into a highly viscous organic layer and a water layer which is decanted. After washing the organic layer with water the polymer is precipitated by pouring in boiling water. The formed flakes are dried at 110° C. [η]=0.84 dl./g. The formed polycarbonate corresponds to the formula:

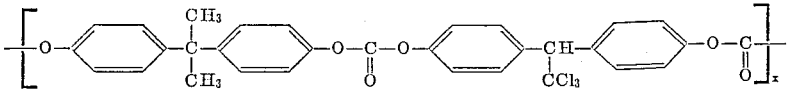

Example 21

The same procedure as in Example 20 is carried through, employing however as a catalyst 120 mg. of triphenyl methyl arsonium iodide. [η]=1.06 dl./g.

Example 22

In a 250 cm.³ three-necked flask fitted with a stirrer and a dropping funnel are placed 2.28 g. (0.01 mol) of 2,2-bis(4'-hydroxyphenyl)-propane, 100 mg. (2% based on the weight of polymer) of S,S'-p-xylylene-bis(dihydroxyethyl sulphonium bromide), 20.4 cm.³ (in an excess of 2%) of N sodium hydroxide and 3 cm.³ of methylene chloride. Over 5 min. is added thereto a solution of 3.565 g. (0.01 mol plus an excess of 1%) of dichloroformate of 2,2-bis(4'-hydroxyphenyl)-propane in 7 cm.³ of methylene chloride. After rinsing the dropping funnel with 5 cm.³ of methylene chloride, stirring is continued for still 30 min. During the polycondensation the reaction mixture separates into a highly viscous organic layer and a water layer which is decanted. After washing the organic layer with water, the polymer is precipitated by pouring in boiling water. The formed flakes are dried at 110° C. [η]=0.76 dl./g.

Example 23

The same procedure as in Example 22 is carried through, stirring, however, for only 5 min. [η]=0.38 dl./g.

Example 24

The same procedure as in Example 22 is carried through, employing, however, as a catalyst 100 mg. of hexamethylene - S,S' - bis(dimethyl) - 1,6 - disulphonium bromide. [η]=0.54 dl./g.

Example 25

The same procedure as in Example 22 is carried through, employing, however, as a catalyst 100 mg. of tribenzyl sulphonium hydrogenium sulphate. [η]=0.82 dl./g.

Example 26

In a 3 l. three-necked flask fitted with a stirrer, a dropping funnel and a thermometer are placed 70 g. of sodium hydroxide, 145 g. of 2,2-bis(4'-hydroxyphenyl)-propane, 700 cm.³ of water and 400 cm.³ of methylene chloride. Over 90 minutes 73 g. of phosgene are introduced whilst suitably cooling for maintaining the temperature between 20 and 25° C. After 5 min. 3 g. of S,S'-p-xylylene-bis(dihydroxyethyl sulphonium bromide) are added to the reaction mixture which is then stirred for still 45 minutes. The obtained stiff paste is diluted with methylene chloride and washed with water. The polymer is precipitated in boiling water. The formed flakes are dried at 110° C. [η]=0.72 dl./g.

Example 27

2.28 g. of 2,2-bis(4'-hydroxyphenyl)-propane, 20.3 cm.³ of N sodium hydroxide, 100 mg. of 2-hydroxyphenyl dimethyl sulphonium chloride and 5 cm.³ of methylene chloride are successively brought into a three-necked 250 cm.³ flask, provided with a stirrer and a dropping funnel. Whilst stirring and at 20° C., a solution of 3.565 g. of dichloroformate of 2,2-bis(4'-hydroxyphenyl)-propane in 10 cm.³ of methylene chloride is dropwise added within 5 minutes. After adding this solution, the reaction mixture is stirred at room temperature for another 45 min. The formed supernatant aqueous layer is decanted from the organic layer which is washed two times with 25 cm.³ of water whilst strongly stirring. The polymer is isolated by pouring out the polymer solution in boiling water, and drying the precipitate at 100° C. [η]=0.78 dl./g.

Example 28

2.28 g. of 2,2-bis(4'-hydroxyphenyl)-propane, 20.3 cm.³ of an N sodium hydroxide solution, 100 mg. of 3,5-dihydroxyphenyl dimethyl sulphonium chloride and 5 cm.³ of methylene chloride are successively brought into a three-necked 250 cm.³ flask, provided with a stirrer and a dropping funnel. Whilst stirring and at 20° C., a solution of 3.565 g. of dichloroformate of 2,2-bis(4'-hydroxyphenyl)-propane in 10 cm.³ of methylene chloride is dropwise added within 5 minutes. After adding this solution, the reaction mixture is stirred at room temperature for another 45 min. The supernatant aqueous layer is decanted from the organic layer which is washed two times with 25 cm.³ of water whilst strongly stirring. The polymer is isolated by pouring out the polymer solution in boiling water, and drying the precipitate at 100° C. [η]=0.64 dl./g.

I claim:

A process for the manufacture of high-molecular weight linear thermoplastic polycarbonates which comprises reacting in an aqueous alkaline solution a diphenol with at least one member selected from the group consisting of phosgene, a dichlorocarbonic acid ester of a diphenol, a dichlorocarbonic acid ester of an aliphatic glycol and a dichlorocarbonic acid ester of a cycloaliphatic glycol, in the presence as a catalyst of a tertiary sulphonium compound.

References Cited by the Examiner

UNITED STATES PATENTS 3,039,998   6/1962   Boerma _____ 260—75

WILLIAM H. SHORT, *Primary Examiner.*

PHILIP E. MANGAN, H. N. BURSTEIN, *Examiners.*